Sept 10, 1957 F. SCHMIDT 2,806,085
CIRCUIT ARRANGEMENT TO IMPROVE THE IMPULSING AND FEEDING IN RESPECT TO STATIONS WITH A LONG SUBSCRIBER'S LINE
Filed Oct. 22, 1952
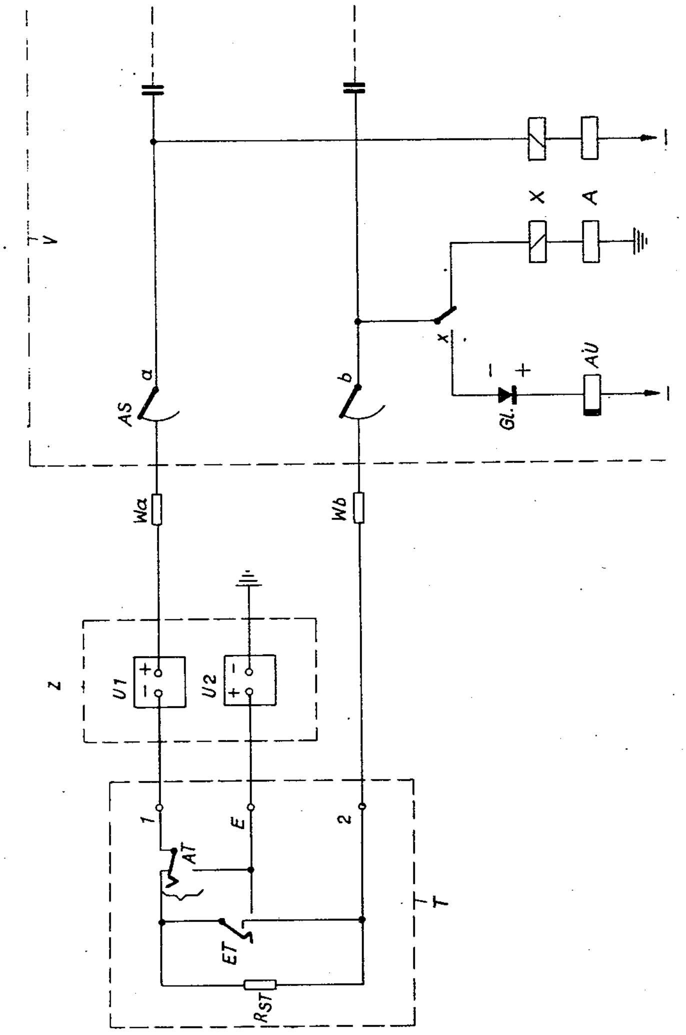
INVENTOR
FRITZ SCHMIDT United States Patent Office 2,806,085

Patented Sept. 10, 1957

2,806,085

CIRCUIT ARRANGEMENT TO IMPROVE THE IMPULSING AND FEEDING IN RESPECT TO STATIONS WITH A LONG SUBSCRIBER'S LINE

Fritz Schmidt, Stuttgart-Zuffenhausen, Germany, assignor to International Standard Electric Corporation, New York, N. Y., a corporation of Delaware Application October 22, 1952, Serial No. 316,132

Claims priority, application Germany November 22, 1951

6 Claims. (Cl. 179—16)

This invention relates to a circuit arrangement for improving the impulsing and feeding in connection with stations with a long subscriber's line.

It is known to provide circuits in which an additional current source is looped into the subscriber's line in such a manner that the voltages of the exchange battery and the additional current source are added. This provides an increased voltage for signalling over long lines. With such an arrangement of the additional current source, it has been found that special signals, transmitted by the subscriber's stations to carry out certain switching procedures, such as the initiation of consultation calls or offerings, were objectionable in the prearranged connecting stages.

The object of this invention is to improve such a circuit, whereby it becomes possible to carry out switching operations—besides the impulsing—in the case of long subscriber lines. According to the present invention this will be achieved by providing another additional current source for substations equipped with a ground transfer button in the ground circuit, the arrangement being such that the voltage of said current source will be added to the voltages of the other current source when said ground transfer button is depressed.

An embodiment of the present invention is shown in the accompanying circuit diagram. An unrestricted station T, i. e., one which is entitled to carry out consultation calls or offering calls, is connected via a long subscriber's line W*a*, W*b*, to a connecting stage V. Said connecting stage is provided with a line finder AS acting as a preselecting unit.

The connecting circuit is provided with a relay A having two windings either or both of which can operate the relay when energized, a differential relay X having two windings which maintain the relay unoperated when equally energized, and a relay AU. The relay A, when operated, busies the connecting circuit; the relay X, operated alone, informs the connecting circuit that a consultation call is desired; and the relays X and AU, operated together, inform the connecting circuit that an offering call is desired.

An additional current source U1, assigned to an additional feeding implement Z, is looped into the *a*-wire of the subscriber's line. Another additional current source U2 is connected via the ground transfer button ET to the subscriber's line.

Assuming first of all that the subscriber removes his handset, which is denoted by resistance RST, the line finder AS is adjusted to the calling subscriber in a well known manner, not shown. The following circuit will now be established: plus, left hand winding of relay A, left hand winding of relay X, *x*, wiper *b* of the line finder AS, resistance W*b*, terminal 2, subscriber's handset RST, button AT, terminal 1, current source U1 (Z), resistance W*a*, wiper *a* of the line finder AS, right hand winding of relay X, right hand winding of relay A, minus.

In the course of this circuit the additional current source U1 is looped into the *a*-wire in such a manner that its voltage is added to the voltage of the exchange battery. Relay A is energized, whereas relay X remains in the rest position due to the differential arrangement of the windings.

If the ground transfer button ET is depressed by the subscriber, then a second additional current source U2 is applied to the *a*/*b*-wire of the subscriber's line via the ground circuit. Said voltage U2 is added to the voltage U1 and the exchange battery, via the *a*-wire, so that relay X will now be energized over the circuit: plus, current source U2, terminal E, button ET, button AT, current source U1, resistance W*a*, wiper *a* of the line finder AS, right hand winding of relay X, right hand winding of relay A, minus.

Contact *x* switches over, so that now also a circuit will be completed via current source U2, additionally looped into the ground circuit, and relay AU will be energized due to the voltage addition with the exchange battery: plus, current source U2, terminal E, button ET, resistance W*b*, wiper *b* of the line finder AS, *x*, rectifier G1, relay AU, minus.

Rectifier G1 in this circuit is a blocking rectifier and serves to prevent linkages which would cause unwanted operation of relay AU. Relay AU, for instance, may effect the offering to a busy station user.

If the station user only wants to initiate a consultation call, then he depresses the push-button AT. Said button interrupts the *b*-wire and applies both additional current sources U1, U2, in series, via the *a*-wire to the exchange battery: plus, current source U2, terminal E, button AT, terminal 1, current source U1, resistance W*a*, wiper *a* of the line finder AS, right hand winding of relay X, right-hand winding of relay A, minus.

Accordingly the exchange battery and the additional batteries are connected in series in this circuit, so that relay X can be unobjectionably energized (without the operation of relay AU) and may then initiate the consultation call.

What is claimed is:

1. A circuit arrangement for use with long subscribers' lines comprising an exchange, a subscriber's station including a handset, a pair of conductors for connecting said station to said exchange, a first source of potential at said exchange having one pole connected to ground, a first relay at said exchange, means for connecting the winding of said first relay in series with said source of potential across said conductors, said relay being marginal and arranged to be unoperated when the handset of the subscriber is lifted to complete the loop through said line, a second relay at said exchange, means under control of said first relay for connecting the winding of said second relay between the ungrounded pole of said first source of potential and one of said conductors, a second source of potential adjacent said subscriber's station having the opposite pole connected to ground from that of said first source, and means at said subscriber's station for connecting the ungrounded pole of said second source of potential to both said conductor's said two sources of potential thus being aiding, whereby said first and second relays are sequentially operated.

2. A circuit arrangement, according to claim 1, further comprising second means at the station for connecting said second source of potential to that one of said conductors and to that one only which is not connected to the second relay under control of the first relay, whereby said first relay will operate without said second relay operating.

3. A circuit arrangement, according to claim 2, further comprising a unidirectional current carrying device in the circuit of the second relay, so poled as to block current flow through said relay except from the second source of potential.

4. A circuit arrangement, according to claim 1, further comprising a unidirectional current carrying device in the circuit of the second relay, so poled as to block current flow through said relay except from the second source of potential.

5. A circuit arrangement, as defined in claim 1, in which the first relay has two windings which are differentially wound and in which the means for connecting the windings of said first relay across the conductors comprises means for connecting the said two windings respectively to said conductors.

6. A circuit arrangement for use with long subscribers' lines comprising an exchange, a subscriber's station including a handset, first and second conductors for connecting said station to said exchange, a first source of potential at said exchange having one pole connected to ground, a first relay at said exchange having a pair of differentially wound windings, means for connecting one winding of said relay between the other pole of said first source of potential and said first conductor, a second source of potential at said station, the pole of said second source corresponding to the grounded pole of said first source being connected to said first conductor, means for connecting the other pole to said handset, means for connecting the other winding of said first relay between ground and said second conductor, means for connecting said second conductor to the other terminal of said handset, said means including a back contact of said first relay, whereby said first and second sources, said handset, and said first and second windings of said first relay will be connected in series, but said first relay will not operate owing to the same current flowing in the differential first and second windings thereof, a third source of potential at said station, the pole of said third source corresponding to the ungrounded pole of said first source being connected to ground, first manually operable means at said station for connecting the other pole of said third source to both first and second conductors, whereby the first winding of said first relay is in series with said first, second, and third sources, the potentials thereof being aiding, so as to operate said first relay over said first winding thereof, a second relay at said exchange having a winding, means including a front contact of said first relay for connecting the winding of said second relay between the ungrounded pole of said first source of potential and said second conductor, whereby the operator of said first relay will operate said second relay, second manually operable means at said station for connecting the other pole of said third source of potential to the other pole of said second source of potential and for disconnecting said other pole of said second source of potential from said handset, whereby said first winding of said first relay is in series with said first, second, and third source and is caused to operate without causing the operation of said second relay.

References Cited in the file of this patent

UNITED STATES PATENTS

| | | |
|---|---|---|
| 1,448,572 | Polinkowsky | Mar. 13, 1923 |
| 1,613,685 | Vernam et al. | Jan. 11, 1927 |
| 1,634,299 | Parker | July 5, 1927 |
| 1,852,619 | Lomax et al. | Apr. 5, 1932 |
| 1,882,851 | Matthies | Oct. 18, 1932 |
| 2,020,816 | Voss et al. | Nov. 12, 1935 |
| 2,374,072 | Beaumont | Apr. 17, 1945 |
| 2,377,544 | Durkin | June 5, 1945 |